United States Patent [19]

Wiltsie

[11] Patent Number: 4,590,827
[45] Date of Patent: May 27, 1986

[54] RECESS TOOL HOLDER

[75] Inventor: Jeffrey S. Wiltsie, Delphos, Ohio

[73] Assignee: Vanamatic Company, Delphos, Ohio

[21] Appl. No.: 607,561

[22] Filed: May 7, 1984

[51] Int. Cl.$^4$ .................. B23B 29/034; B23B 29/18
[52] U.S. Cl. ................................. 82/11; 82/DIG. 3
[58] Field of Search ............... 82/DIG. 3, 11, 36 R, 82/1.2, 1.4, 24 A

[56] References Cited

U.S. PATENT DOCUMENTS

| | | | |
|---|---|---|---|
| 1,928,529 | 9/1933 | Garrard | 82/11 |
| 2,495,291 | 1/1950 | Schlitters | 82/11 |
| 2,521,619 | 9/1950 | Weld | 82/DIG. 3 |
| 2,637,237 | 5/1953 | Montgomery . | |
| 2,804,786 | 9/1957 | Stenger | 82/1.2 |
| 3,208,312 | 9/1965 | Heuser | 408/81 |
| 3,301,099 | 1/1967 | Stecker | 82/11 |
| 3,380,326 | 4/1968 | Waddy . | |
| 3,408,885 | 11/1968 | Mendenhall . | |
| 3,451,308 | 6/1969 | Zeller . | |
| 3,466,955 | 9/1969 | Stier . | |
| 3,477,319 | 11/1969 | Koppelmann . | |
| 3,489,042 | 1/1970 | Papp . | |
| 3,603,185 | 9/1971 | Curry . | |
| 3,643,531 | 2/1972 | Burke et al. | 82/11 |
| 3,668,954 | 6/1972 | Brown . | |
| 3,731,562 | 5/1973 | Heuser . | |
| 3,731,565 | 5/1973 | Barkhurst . | |
| 3,822,619 | 7/1974 | Willen . | |
| 3,916,739 | 11/1975 | Nomura . | |
| 4,080,854 | 3/1978 | Peterson . | |
| 4,128,026 | 12/1978 | Scaduto | 82/11 |
| 4,218,941 | 8/1980 | David-Malig . | |
| 4,271,735 | 6/1981 | Denman . | |

OTHER PUBLICATIONS

Advertisement for Recess Tool Holders made by Slitters' Tool, 1980.

Primary Examiner—Francis S. Husar
Assistant Examiner—Jerry Kearns
Attorney, Agent, or Firm—Emch, Schaffer, Schaub & Porcello Co.

[57] ABSTRACT

A tool holder for a recess cutting tool that is used to make a recess cut in a workpiece is disclosed. The tool holder is positioned on a machine tool and the machine tool has a spindle for holding the workpiece and a moveable tool slide for advancing the recess cutting tool towards the workpiece. The tool holder has a tool carrier means positioned on the moveable tool slide and the tool carrier means is adapted for securely holding the recess cutting tool. The tool carrier means is disposed for advancing with the tool slide towards the workpiece and being radially displaced with respect to the tool slide to make a recess cut in the workpiece. An adjustable rod is connected to the tool carrier means. The rod extends from the tool carrier means in a direction towards the workpiece. An adjustment stop is positioned on the machine tool adjacent the workpiece. The stop extends from the machine tool towards the tool carrier means. The stop is disposed in alignment with the rod on the tool carrier means whereby the stop and the rod can be positioned to control the position of the recess cutting tool with respect to the workpiece to compensate for wear in the spindle that holds the workpiece.

10 Claims, 4 Drawing Figures

4,590,827

RECESS TOOL HOLDER

BACKGROUND OF THE INVENTION

This invention is directed to a holder for a recess cutting tool. The holder is used with a multiple spindle machine tool having several spindles that are positioned to hold a workpiece. The tool holder is designed to adjust to variations, and compensate for wear, in the spindles that are used to hold the workpiece while the recessed cut is being made.

Because of the basic design of this tool holder, normal tool change adjustments are mush faster and accurate. Also, in some recess cutting operations, more dwell time is necessary than normally provided. This tool holder can accomodate the extra dwell time without affecting any other tool or tool holders used in the multiple spindle machine tool.

Multiple spindle machine tools have been known and used for several years to perform machining operations on various types of workpieces. The multiple spindle machine tools have a plurality of rotatable spindles that are positioned to hold the workpieces so that cutting tools can perform various machining operations on the workpiece. Normally, the spindles are positioned on a rotating spindle carrier and the workpiece is indexed to various work stations on the multiple spindle machine tool. Various machining operations can be performed at each of the work stations. In this manner one multiple spindle machine tool can perform several machining operations on a workpiece.

The spindles are usually rotatably supported by bearings in the rotating spindle carrier. During the course of use, the bearing housings for the individual spindles become worn. This is particularlly true where the machining operations produce heavy loads on the workpiece that must be absorbed by the supporting bearings. The wear on the bearings is not always uniform as the workpiece rotates during the machining operations. In addition, the wear on the bearing housings of the individual spindles is not uniform and the spindles at different positions on the multiple spindle machine tool will have different locations around the centerline of the rotating carrier. Thus, as the multiple spindle machine tool indexes to a new work station the spindle that is moved into that work station will not have the same centerline as the other spindles that have been indexed to that work station. Accordingly, it is particularly difficult to maintain close tolerances when performing various machining operations on such a multiple spindle machine tool. The closer the tolerance requirements the more difficult it is to utilize a multiple spindle machine tool where the bearings for the spindles have become worn.

The above difficulties are compounded when a recess cut is to be made in a workpiece. A recess cut or machining operation takes place inside a passageway or opening in the workpiece. It is necessary to precisely position the cutting tool at the right location in the opening in the workpiece and then move the cutting piece radially outward to make the recess cut. To hold close tolerances on such a recess cut it is necessary to precisely position the cutting tool with respect to the workpiece. This is particularly difficult to do if the spindle that is supporting the workpiece has worn bearings. As the workpiece is rotated to make the recess cut the worm bearings will allow the workpiece to wobble slightly and prevent the cutting tool from making the recess cut with the precision desired. Since the recess cut is being made on the interior of the workpiece, it is also extremely difficult to check or maintain tolerances while the cutting operation it taking place. Normally, the recess cut is not even visible to the operator of the multiple spindle machine tool.

As multiple spindle machine tools begin to lose precision as the bearing housing become worn the machine can no longer be used for close tolerance precision work. When this occurs, the usefulness of the machine is greatly reduce as the machine can only be used to perform machine operations that do not require a great deal of precision. In addition, the owner of the machine tool was faced with buying a new machine tool to continue to do precision work. Thus, the wear on the bearing housings that support the spindles on the multiple spindle machine tool greatly effect the useability and useful life of such machining equipment.

Accordingly, there is a need in the industry for a multiple spindle machine tool that can correct for wear that developes in the spindles that support the workpiece upon which the machining operations are being performed. It is also desirable to have a mechanism that will compensate for the different wear that developes on each individual spindle of the multiple spindle machine tool. It is also desirable to have a correction mechanism that can accomodate additional wear on the spindles that takes place as the multiple spindle machine tool receives additional use and wear-to-tear. The above considerations are particularly important if a multiple spindle machine tool is to be used for high precision work over an extended period of time.

SUMMARY OF THE INVENTION

The invention is directed to a tool holder for a recess cutting tool that is used to make a recess cut in a workpiece. The tool holder is positioned on a machine tool and the machine tool has a spindle for holding the workpiece and a moveable tool slide for advancing the recess cutting tool towards the workpiece. The tool holder has a tool carrier means positioned on the moveable tool slide and the tool carrier means is adapted for securely holding the recess cutting tool. The tool carrier means is disposed for advancing with the tool slide towards the workpiece and being radially displaced with respect to the tool slide to make a recess cut in the workpiece. An adjustable rod is connected to the tool carrier means. The rod extends from the tool carrier means in a direction towards the workpiece. An adjustment stop is positioned on the machine tool adjacent the workpiece. The stop extends from the machine tool towards to tool carrier means. The stop is disposed in alignment with the rod on the tool carrier means whereby the stop and the rod can be positioned to control the position of the recess cutting tool with respect to the workpiece to compensate for wear in the spindle that holds the workpiece.

DESCRIPTION OF THE PREFERRED EMBODIMENT

Figure 1:
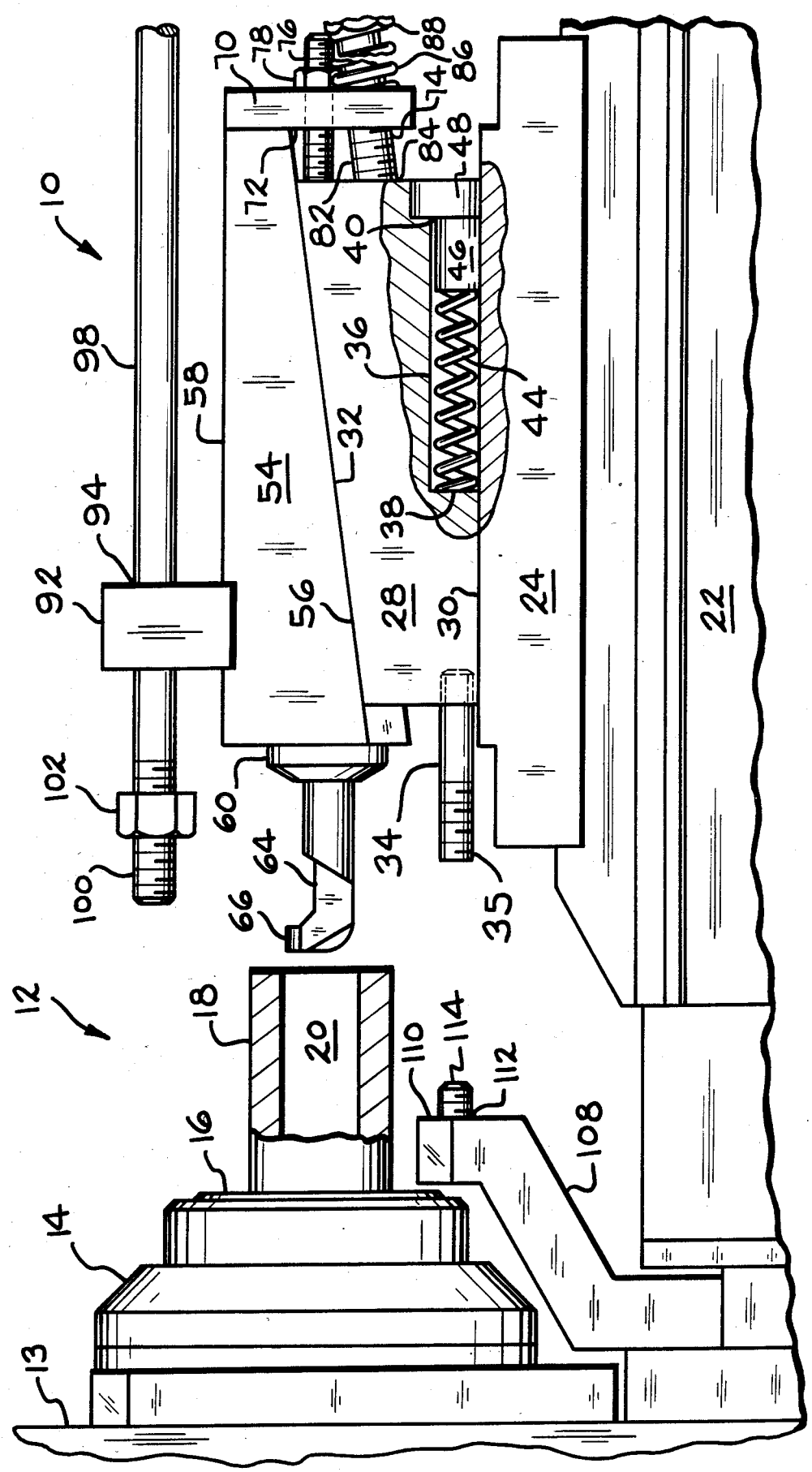
FIG. 1 is a side elevational view, partially broken away, showing the holder for a recess cutting tool of the present invention.

This invention is directed to a holder for a recess cutting tool. More particularly, the tool holder is designed to be adjustable to compensate for wear in the spindle that holds the workpiece in which the recess cut is being made. The details of the invention will be more readily understood by referring to the attached drawings in connection with the following description.

The tool holder 10 is positioned on a multiple spindle machine tool 12 having a plurality of rotatable spindles 14. The spindles 14 are located on a rotatable spindle carrier member 13. The spindles 14 include a chuck mechanism 16 that is used to center and secure a workpiece 18. The rotary spindles 14 are operatively connected to a drive means (not shown) that can cause the spindles 14 and workpiece 18 to rotate. The spindles 14 are also disposed so that the spindle carrier member 13 can be rotated to index the spindles 14 to different work stations on the multiple spindle machine tool 12. This allows several machine operations to be performed on the workpiece as it is rotated to various work stations on the multiple spindle machine tool.

A moveable tool slide 22 is positioned adjacent the plurality of spindles 14. The tool slide is moveable in a direction away from and towards the rotatable spindles 14. The moveable tool slide 22 moves in a plane that is substantially parallel to an axis passing through the center of the chuck mechanism 16 on the rotatable spindles 14. An attachment bracket 24 is secured to the tool slide 22. The attachment bracket is securely fixed to the tool side so that the attachment bracket moves with the tool slide when the tool slide moves. An adjustment slide 28 is moveably positioned on the attachment bracket 24. The adjustment slide 28 is normally positioned in a slotted dovetail on the attachment bracket 24 so that the adjustment slide is free to move in a direction away from and towards the workpiece 18. However, the adjustment slide 28 will be restricted from movement in other directions by the slotted dovetail on the attachment bracket 24. The adjustment slide has a first surface 30 that is positioned in contact with the attachment bracket 24 and a second surface 32 that is spaced apart from the attachment bracket. The second surface 32 is disposed at an angle with respect to a moveable tool slide 22. An adjustable guide rod 34 extends from the end of the adjustment slide 28 that is adjacent the spindle 14. The adjustable guide rod 34 extends from the adjustment slide 28 in a direction towards the spindle 14. The adjustable guide rod is disposed stubstantially parallel to the direction of movement of the tool slide 22. The guide rod 34 has an adjustable end 35. The adjustable end 35 is located on the end of the guide rod 34 that is spaced apart from the adjustment slide 28. The adjustable end 35 is a threaded portion that threadingly engages the guide rod 34. By rotating the adjustable end 35, the guide rod 34 can be varied in length.

A passageway 36 is positioned in the adjustment slide adjacent and in communication with the attachment bracket 24. The passageway has a first end 38 and a second end 40. A spring 44 is positioned in the passageway and one end of the spring is in contact with the first end of the passageway 36. An engagement member 46 extends from the attachment bracket 24 into the passageway 36 in the adjusting slide 28. The engagement member 46 is positioned between the spring 44 and the second end 40 of the passageway 36. A flange 48 is positioned on the adjustment slide 28 to close the second end 40 of the passageway 36. The engagement member 46 is also positioned adjacent to the flange 48. A tool carrier 54 is moveably positioned on the adjustment slide 28. The tool carrier 54 has a first surface 56 and a second surface 58. The first surface 56 of the tool carrier 54 is positioned on the second surface 32 of the adjustment slide 28. The first surface 56 of the tool carrier 54 is positioned at substantially the same angle with regard to the tool slide as the second surface 32 of the adjustment slide 28. The tool carrier 54 is normally positioned in a slotted dovetail on the adjustment slide 28 and this allows the tool carrier 54 to move in a direction towards and away from the workpiece 18 but restrains the tool carrier from movement in other directions.

A chuck mechanism 60 is positioned on the end of the tool carrier 54 that faces the workpiece 18. The chuck mechanism 60 is disposed to securely hold a recess cutting tool 64. The recess cutting tool 64 has a cutting edge 66 that extends from the cutting tool for making the recess cut in the workpiece 18.

A flange 70 is positioned on the end of the tool carrier 54 that is positioned opposite to the chuck mechanism 60. The flange 70 extends from the tool carrier 54 in a direction towards the tool slide 22. A portion of the flange 70 is positioned in adjacent spaced apart relationship to the adjustment slide 28. A threaded aperture 72 extends through this portion of the flange 70. A passageway 74 also extends through this portion of the flange 70. A threaded adjusting screw 76 is positioned in engagement with the threaded aperture 72 in the flange 70. The adjusting screw 76 extends through the flange 70 in a direction towards the adjustment slide 28. A locknut 78 is positioned on the portion of the adjusting screw 76 that extends from the flange 70 in a direction away from the adjustment slide 28. The locknut 78 is disposed on the adjusting screw 76 to control the length of the adjusting screw that extends through the flange 70 in a direction towards the adjustment slide 28. A threaded rod 82 is moveably positioned in the passageway 74 in the flange 70. The threaded rod 82 extends in a direction towards the adjustment slide 28 and is secured in a threaded aperture 84 in the adjustment slide 28. A portion of the threaded rod 82 extends from the flange 70 in a direction away from the adjustment slide 28. A spring 86 is positioned on this portion of the threaded rod 82. A nut 88 is located on the end of the threaded rod 82 that is spaced apart from the flange 70 in a direction away from the adjustment slide 28. The nut 88 can be advanced on the threaded rod 82 to adjust the degree of compression of the spring 86 on the threaded rod 82.

A bracket 92 extends from the second surface 58 of the tool carrier 54 in a direction away from the adjustment slide 28. The bracket 92 defines a passageway 94. A drawrod 98 is positioned in adjacent spaced apart relationship with the second surface 58 of the tool carrier 54. The drawrod 98 is positioned substantially parallel to the second surface 58. The drawrod 98 is slideably positioned through the passageway 94 in the bracket 92 that extends from the tool carrier 54. One end of the drawrod 98 is positioned adjacent the workpiece 18 and contains a threaded portion 100. A stopnut 102 is positioned on the threaded portion 100 of the drawrod 98. The stopnut 102 is large enough so that it will not pass through the passageway 94 in the bracket 92.

A stop bracket 108 is positioned on the multiple spindle machine tool adjacent the rotatable spindle 14. There is a stop bracket 108 for each spindle on the machine tool and the stop brackets index or move with the rotary spindles as the rotary spindles are indexed to difference work stations. A first end 110 of the stop bracket 108 is positioned adjacent the chuck mechanism 16 and workpiece 18. The first end 110 of the stop bracket 108 contains a threaded aperture 112. An adjustable stop member 114 is threadably positioned in the threaded aperture 112 in the stop bracket 108. The adjustable stop member 114 extends from the stop bracket 108 in a direction towards the adjustment slide 28. The stop member 114 is disposed to be in substantial alignment with the adjustable guide rod 34 that extends from the ajustment slide 28.

The operation of the invention will be more fully understood by referring to the attached drawings in connection with the following description.

To use the tool holder 10 to make a recess cut a workpiece 18 is positioned in the chuck mechanism 16 on a rotary spindle 14 for a multiple spindle machine tool 12. The workpiece 18 is attached to the rotary spindle 14 and centered by the chuck mechanism 16. The workpiece 18 has a passageway 20 defined therein where the recess cut is to be made. The rotatable spindle 14 is then indexed or advanced to the recess cutting station for the machine tool 12. When the spindle is properly positioned at the recess cutting station, the recess cutting tool 64 will be positioned in alignment with the passageway 20 in the workpiece 18. To insure that the recess cutting tool 64 is properly positioned the adjusting screw 76 can be advanced in the threaded aperture 72 of the flange 70 to slideably position the tool carrier 54 on the adjustment slide 28 so that the recess cutting tool is in alignment with the passageway 20 in the workpiece. When the recess cutting tool is properly positioned, the nut 78 is advanced on the adjusting screw 76 until the nut is in contact with the flange 70. This secures the adjusting screw 76 in the proper position to allow the recess cutting tool 64 to enter the passagway 20 in the workpiece 18. Normally, once the adjusting screw 76 has been adjusted there is no need for further adjustment unless there is a change in the workpiece or the recess cut that is being made.

After the recess cutting tool 64 is positioned in alignment with the passageway 20, the tool slide 22 is advanced towards the rotatable spindle 14. As the tool slide 22 advances the attachment bracket 24 which is secured to the tool slide also advances towards the rotatable spindle. The engagement member 46 that extends from the attachment bracket 24 into the passageway 36 on the adjustment slide 28 engages the spring 44. The force exerted by the engagement member 46 on the spring 44 causes the adjustment slide 28 to also advance towards the rotatable spindle 14. The advancement of the adjustment slide 28 causes the tool carrier 54, which is slideably attached to the adjustment slide 28, to also advance towards the rotatable spindle 14. The spring 86 which is positioned around the threaded rod 82 acts upon the flange 70 to urge the flange 70 towards the adjustment slide 28. The flange 70 is held in spaced apart relationship from the adjustment slide 28 by the adjusting screw 76 that extends through the flange 70. Accordingly, the force of the spring 86 acts on the flange 70 and keep the adjusting screw 76 in contact with the rear edge of the adjustment slide 28. Thus, as the adjusting slide 28 advances the spring 86 also causes the flange 70 to advance towards the rotatable spindle 14. Since the flange 70 is connected to the tool carrier 54, the tool carrier is also advanced towards the rotatable spindle 14.

The tool carrier 54 will advance towards the workpiece 18 until the bracket 92, that is attached to the tool carrier, engages the stopnut 102 on the drawrod 98. When the bracket 92 engages the stopnut 102, the tool carrier 54 is constrained from further advancement towards the rotatable spindle 14. Accordingly, the stopnut 102 is positioned on the threaded portion 100 of the drawrod 98 to stop the advancement of the tool carrier 54 when the recess cutting tool 64 is in the proper position for making the recess cut in the workpiece 18.

Figure 2:
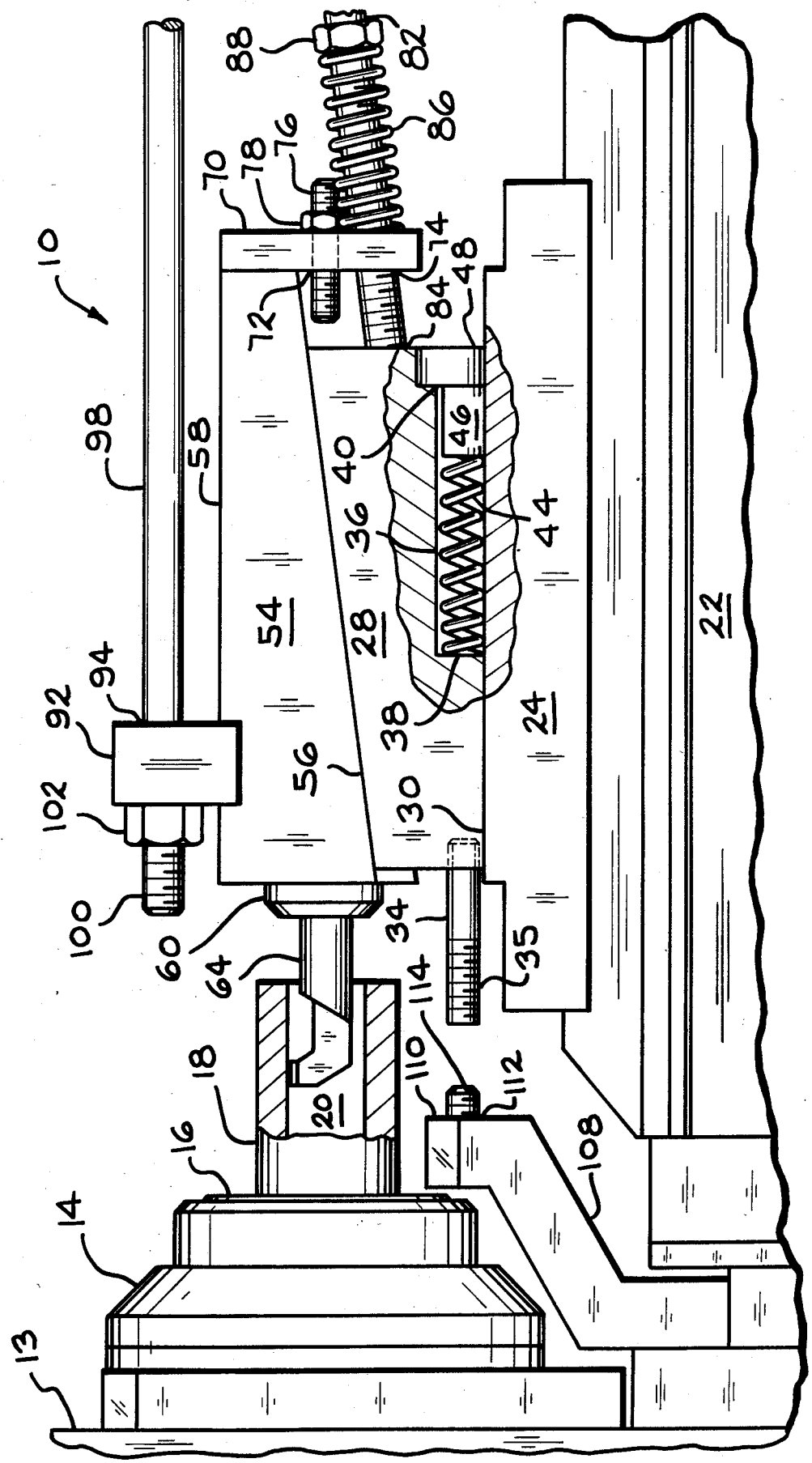
FIG. 2 is a side elevational view, partially broken away, showing a different position for the holder for a recess cutting tool.
Figure 3:
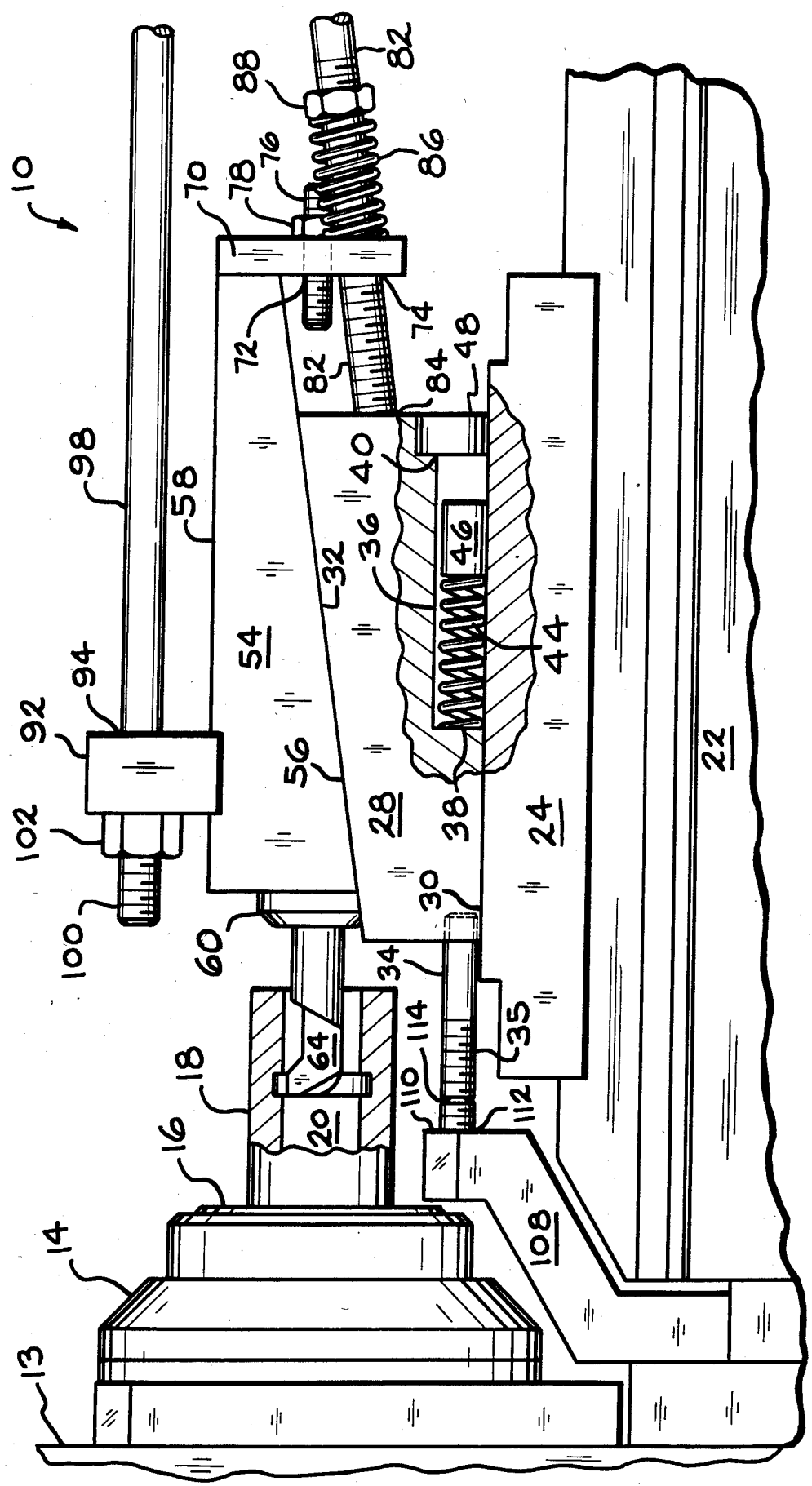
FIG. 3 is a side elevational view, partially broken away, showing the recess cutting tool making a recess cut in a workpiece.

Once the bracket 92 engages the stopnut 102, the tool carrier 54 is prevented from advancing towards the spindle 14 and the recess cutting tool 64 is in the proper position for making the recess cut in the passageway 20 of the workpiece 18. However, the tool slide 22, attachment bracket 24 and adjustment slide 28 continue to advance towards the rotatable spindle 14. Since the second surface 32 of the adjustment slide 28 is disposed at an angle with regard to the tool slide 22, the advancement of the adjustment slide 28 will cause the tool carrier 54 to be radially displaced as seen in FIG. 2. The radial displacement of the tool carrier causes the cutting edge 66 of the recess cutting tool 64 to come into contact with the surface of the passageway 20 in the workpiece 18. As the adjustment slide 28 continues to advance towards the rotatable spindle 14, the end of the adjustment slide that is positioned adjacent the flange 70 will move away from the end of the adjusting screw 76 that extends from the flange 70 in a direction towards the adjustment slide. At the same time, the spring 86 positioned around the threaded rod 82 is compressed between the flange 70 and the nut 80 on the end of the threaded rod. The adjustment slide 28 will continue to advance towards the rotatable spindle 14 until the adjustable guide rod 34 engages the adjustable stop member 114 located on the stop bracket 108 as shown in FIG. 3. When the adjustable guide rod 34 engages the adjustable stop member 114, the adjustment slide 28 is restrained from further advancement towards the rotatable spindle 14. As the adjustment slide 28 can no longer advance towards the rotatable spindle, the radial displacement of the tool carrier 54 is completed. Thus, the depth of the recess cut is established by when the guide rod 34 comes into contact with the adjustable stop member 114.

After the adjustable guide rod 34 engages the adjustable stop member 114, the tool slide 22 and attachment bracket 24 continue to advance towards the rotatable spindle 14. The advancement of the tool slide and attachment bracket insure that the recess cut is complete. During this advancement of the tool slide and attachment bracket, the engagement members 46 that extends into the passageway 36 on the adjustment slide 28 acts against the spring 44 causing the spring to be compressed. The compression of the spring 44 provides a force on the adjustable slide 28 that causes the guide rod 34 of the adjustment slide 28 to be maintained in contact with the adjustable stop member 114.

Figure 4:
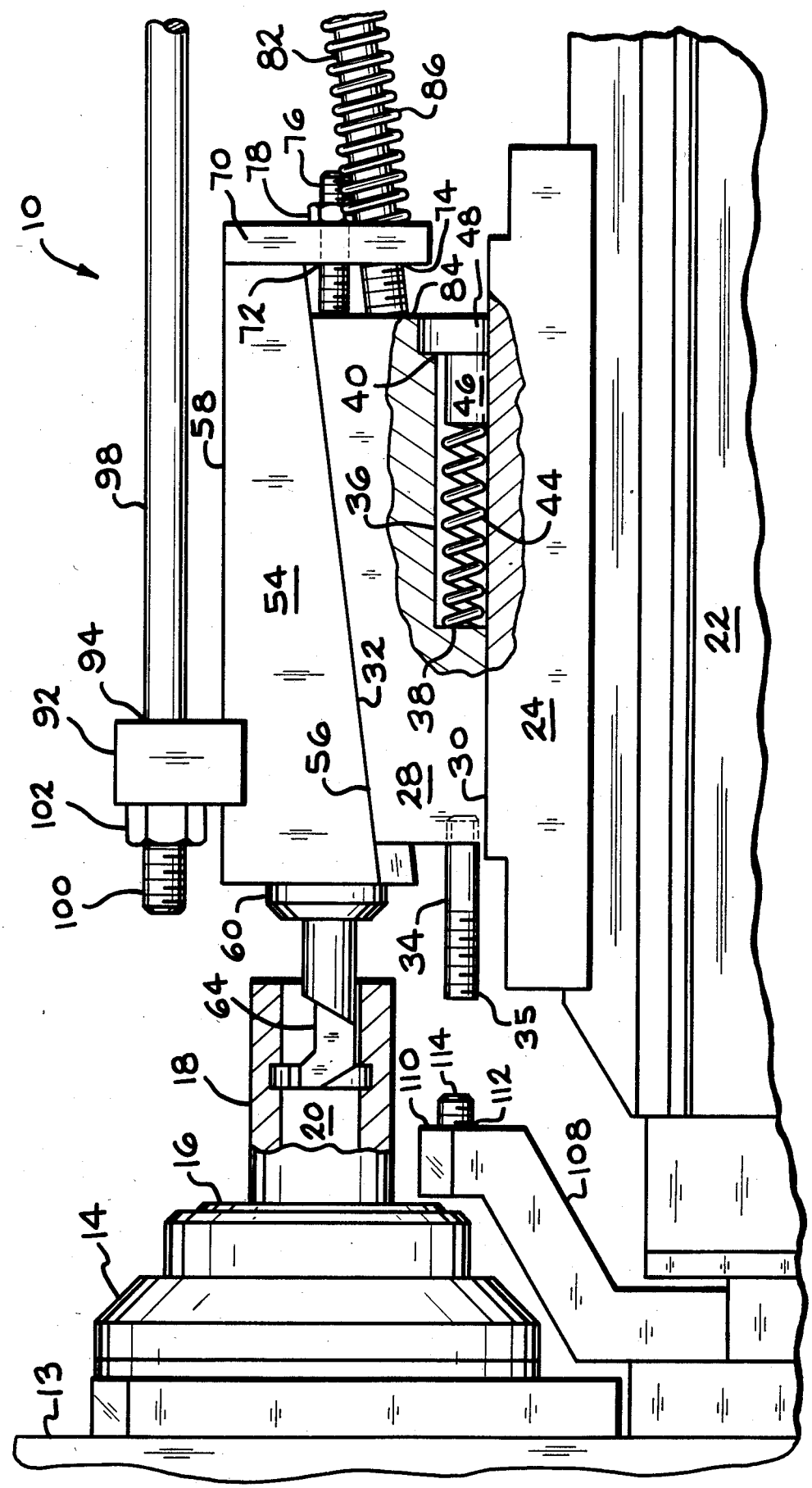
FIG. 4 is a side elevational view, partially broken away, showing the completed recess cut in the workpiece.

After the recess cut has been completed, it is necessary to carefully withdraw the recess cutting tool 64 from the workpiece without damaging the recess cut. To accomplish this the tool slide 22 and attachment bracket 24 are moved away from the rotatable spindle 14 as shown in FIG. 4. The force of the spring 44 against the first end 38 of the passageway 36 maintains the adjustment slide 28 in a position where the guide rod 34 is in contact with the adjustable stop member 114. The adjustment slide 28 is maintained in this position until the engagement member 46 comes into contact with the flange 48 positioned at the end of the passageway 36 in the adjustment slide 28. Once the engagement member 46 contacts the flange 48 the continued movement of the tool slide 22 and attachment bracket 24 in a direction away from the spindle 14 causes the adjustment slide 28 to also advance away from the spindle 14 as the engagement member acts against the flange 48. The movement of the adjustment slide 28 away from the spindle 14 causes the tool carrier 54 to be radially displaced away from the surface of the passageway 20 in the workpiece 18. The tool carrier 54 is radially advanced away from the surface of the passageway 20 until the adjustment slide 28 comes into contact with the end of the adjustment screw 76 that extends from the flange 70. The tool carrier 54 is held in position with the bracket 92 against the stopnut 102 on the drawrod 98 by the force of the spring 86 against the flange 70. The force of the compressed spring 86 is sufficient to maintain the tool carrier 54 in this position until the adjustment slide 28 comes into contact with the adjusting screw 76 and the recess cutting tool 64 is again positioned substantially in the center of the passageway 20 in the workpiece 18. Thus, it can be seen that the movement of the adjustment slide away from the spindle 14 causes the recess cutting tool to be advanced radially away from the recess cut that has just been made in the workpiece 18 and back into the center of the passageway 20 in the workpiece 18. This insures that the recess cut is not damaged by the recess cutting tool 64 as the cutting tool is removed from the workpiece. Once the adjustment slide 28 comes into contact with the adjusting screw 76, further movement of the tool slide 22, attachment bracket 24 and adjustment slide 28 in a direction away from the spindle 14 causes the tool holder 54 to be moved in a direction away from the spindle 14 and the recess cutting tool to be axially removed from the passageway 20 in the workpiece 18. As can be seen the adjustment slide 28 acts against the adjusting screw 76 which extends through the flange 70 to cause the flange 70 and the tool carrier 54 to be advanced away from the workpiece. At the same time the bracket 92 that extends from the tool carrier 54 is axially advanced along the drawrod 98 in a direction away from the rotatable spindle 14.

In practice the rotatable spindle 14 on the machine tool 12 frequently become worn and it is difficult to perform precise machining operations with the machine tool. This is particularly true in making recess cuts that are accomplished inside a workpiece where it is difficult to observe or measure the machining operation. To further complicate the situation the various spindles on a multiple spindle machine tool do not receive a uniform degree of wear. Accordingly, compensation must be made individually for each spindle to accomodate for wear and other variations that develope through use of the multiple spindle machine tool. In the present invention the adjusting screw 76 can be positioned in the threaded aperture 72 in the flange 70 to accurately center the recess cutting tool 64 in the center of the passageway 20 in the workpiece 18. Thus, the recess cutting tool will be properly positioned for entering the workpiece prior to the initiation of the recess cutting operation. The adjustable stop member 114 on the stop bracket 108 can be advanced away from or towards the adjustment side 28 to control the advancement of the adjustment slide 28 and therefore the depth of the recess cut in the workpiece 18. The adjustable stop member 114 in the stop bracket 108 indexes with the adjacent rotatable spindle 14. Once the stop member 114 is properly positioned to produce the desired depth for the recess cut the adjustable stop member will index with the rotatable spindle and it is not necessary to make further adjustments everytime the spindle index to the recess cutting station. Accordingly, the adjustable stop member 114 provides a very accurate adjustment for the spindle adjacent the adjustable stop member 114 and the adjustment indexes with the spindle so that further adjustment is not usually necessary when the spindle is subequently indexed to the work station where the recess cut is being made.

In operation the recess cutting tool 64 is usually advanced into the passageway 20 of the workpiece 18 and the recess cutting operation initiated. The recess cutting tool 64 is then removed from the workpiece and the depth of the recess cut measured. If the depth is not the desired depth the adjustable stop member 114 can be advanced towards or away from the adjustment slide 28 in the required direction to appropriately modify the depth of the recess cut. After the adjustable stop member has been adjusted, the recess cutting tool again is brought into the workpiece to make a recess cut and this process continues by a trial and error method until the appropriate depth of the recess cut is obtained. Once the proper depth is obtained by adjusting the adjustable stop member 114, the rotatable spindle 14 can be used to machine recess cuts to exact tolerances without further modification. As the spindles become more worn, the above adjustment of the adjustable stop member 114 can be repeated to allow the multiple spindle machine tool to continue to make precision recess cuts in a work piece.

The depth of the recess cut can also be varied by rotating the adjustable end 35 of the guide rod 34. The rotation of the adjustable end 35 will cause the length of the guide rod 34 to vary and accordingly vary when the guide rod engages the adjustable stop member 114. By changing the position of the adjustable end 35 the depth of the recess cut is changed. Using the adjustable end 35 to vary the depth of the recess cut provides a simple way to make adjustments to the recess cutting operation once the adjustable stop members 114 adjacent each spindle 14 have been properly positioned. If it is desired to adjust the depth of the recess cut, the adjustable end 35 is rotated to vary the length of the guide rod 34 which changes the depth of the recess cut. This change can be made without adjusting each stop members 114 on the multiple spindle machine tool. Using the adjustable end 35 of the guide rod 34 to vary the depth of the recess cut also does not change the position of the adjustable stop members 114 which have been positioned to compensate for wear in each spindle of the multiple spindle machine tool. Thus, the adjustable end 35 of the guide rod 34 provide another mechanism to control a recess cut in a workpiece.

The above description of the invention is given only for the sake of explanation. Various modifications and substitutions other that those cited can be mde without departing from the scope of the following claims.

What I claim is:

1. A tool holder for a recess cutting tool that can make a recess cut in a workpiece, said holder being positioned on a machine tool, said machine tool having a spindle for holding said workpiece and a moveable tool slide for advancing said recess cutting tool towards said workpiece, said tool holder comprising:
   an attachment bracket having one side removeably secured to said tool slide and said other side of said attachment bracket being spaced apart from said tool slide;
   an adjustment slide having one side moveably positioned on said attachment bracket, said other side of said adjustment slide being spaced apart from said attachment bracket and being disposed at an angle with said tool slide;
   a tool carrier means moveably positioned on said side of said adjustment slide that is spaced apart from said moveable tool slide, said tool carrier means adapted for securely holding said recess cutting tool, said tool carrier means having a side that is disposed at an angle with said tool slide and said side engaging said side of said adjustment slide that is disposed at an angle with said tool slide so that said tool carrier means is radially displaced with respect to said tool slide to make said recess cut in said workpiece when said adjustment slide is advanced along said tool carrier towards said workpiece;
   an adjustable rod connected to said adjustment slide, said rod extending from said adjustment slide in a direction toward said workpiece; and
   an adjustable stop positioned on said machine tool adjacent said workpiece, said stop extending from said machine tool towards said adjustment slide, said stop being disposed in alignment with said rod on said adjustment slide whereby said stop and said rod can be positioned to control the advancement of said adjustment slide towards said workpiece and the radial position of said recess cutting tool with respect to said workpiece to compensate for wear in said spindle that holds said workpiece.

2. The tool carrier of claim 1 wherein said adjustment slide has a passageway that is positioned adjacent and in communication with said attachment bracket, said passageway having a first and a second end, a spring being positioned in said passageway, said spring being in contact with said first end of said passageway.

3. The tool holder of claim 2 wherein an engagement member extends from said attachment bracket into said passageway in said adjusting slide, said engagement member positioned between said spring and said second end of said passageway whereby said spring acts against said first end of said passageway to maintain said adjustable rod in contact with said adjustable stop during said recess cutting operation.

4. The tool holder of claim 3 wherein said tool carrier means has a flange that extends towards said tool slide, said flange extending from said end of said tool carrier that is opposite said recess cutting tool, said flange containing a threaded aperture and a passageway.

5. The tool holder of claim 4 wherein an adjusting screw is threadingly positioned in said threaded aperture in said flange, said adjusting screw extending through said flange in a direction towards said adjusting slide whereby said position of said adjusting screw can be used to contact said adjusting slide to vary the position of said tool carrier with respect to said adjusting slide and said work piece to properly position said tool carrier for making a recess cut in said work piece.

6. The tool holder of claim 4 wherein a drawrod is positioned in adjacent spaced apart relationship to said tool carrier, said drawrod being positioned substantially parallel to the direction of movement of said tool slide, said drawrod having a first end said first end terminating adjacent said workpiece, said first end containing a threaded portion of a stopnut being moveably positioned on said first end of said drawrod in threading engagement with said threaded portion of said drawrod.

7. The tool holder of claim 6 wherein a bracket extends from said tool carrier in a direction towards said drawrod, said bracket having a passageway, said drawrod being disposed to pass through said passageway, said passageway being smaller than said stopnut whereby said stop nut acts to limit the advancement of said bracket and said tool carrier as said tool carrier advances towards said workpiece.

8. The tool holder of claim 7 wherein a threaded rod extends through said passageway in said flange, said threaded rod extending into and being secured to said adjustment slide, said portion of said threaded rod that extends from said flange away from said adjustment slide having a spring positioned around said rod, a nut being positioned on said rod so that said spring extends between said flange and said nut whereby said spring on said threaded rod acts against said flange to maintain said bracket and tool carrier against said stopnut on said drawrod when said tool carrier is advanced to said workpiece during said recess cutting operation.

9. The tool holder of claim 1 wherein the end of said rod that is spaced apart from said adjustment slide has an adjustable end that is moveably positioned on said rod, said adjustable end being moveable to vary the position of said recess cutting tool with respect to said workpiece.

10. A tool holder for making a recess cut in a workpiece comprising:
    a rotary machine tool having a plurality of spindles, said spindles including a chuck for holding a workpiece, said spindles rotating to different positions on said machine for different machining operations;
    a workpiece securely positioned in at least one of said spindles;
    a moveable tool slide positioned adjacent said plurality of spindles, said tool slide moveable in a direction away from and toward said spindles;
    an attachment bracket positioned on said tool slide;
    an adjustment slide moveably positioned on one side to said attachment bracket, said slide having a passageway that is positioned adjacent and in communication with said attachment bracket, said passageway having a first and second end, said other side of said adjustment slide being spaced apart from said attachment bracket and being disposed at an angle with said tool slide;
    a spring positioned in said passageway, said spring being in contact with said first end of said passageway;
    an engagement member extending from said attachment bracket into said passageway in said adjusting slide, said engagement member being positioned between said spring and said second end of said passageway;

an adjustable rod connected to said adjustment slide, said rod extending from said adjustment slide in a direction towards said workpiece;

a tool carrier moveably positioned on said side of said adjustment slide that is spaced apart from said attachment bracket and disposed at an angle with respect to said tool slide, movement of said adjustment side with respect to said tool carrier acting to radially displace said tool carrier with respect to said tool slide acting to radially displace said tool carrier with respect to said tool slide and said workpiece;

a draw rod positioned adjacent said tool carrier, said draw rod being positioned to engage said tool carrier to control the movement of said tool carrier towards said workpiece;

an adjustable stop member positioned adjacent said spindle for said workpiece, said stop member being disposed for engaging said adjustable rod connected to said adjustment slide as said adjustment slide advances towards said workpiece, said stop member being adjustable to control the advancement of said adjustment slide towards said workpiece and to accurately radially position said tool carrier with respect to said workpiece to accomodate wear in said spindle.

* * * * *